United States Patent
Takezawa et al.

(10) Patent No.: US 8,148,012 B2
(45) Date of Patent: Apr. 3, 2012

(54) METHOD FOR FORMING ACTIVE MATERIAL ON A CURRENT COLLECTOR OF NEGATIVE ELECTRODE USING FEEDBACK PROCESS WITH MEASURING COLLECTOR

(75) Inventors: Hideharu Takezawa, Nara (JP); Takayuki Shirane, Osaka (JP); Shinya Fujimura, Osaka (JP); Sadayuki Okazaki, Osaka (JP); Kazuyoshi Honda, Osaka (JP)

(73) Assignee: Panasonic Corporation, Osaka (JP)

( * ) Notice: Subject to any disclaimer, the term of this patent is extended or adjusted under 35 U.S.C. 154(b) by 1041 days.

(21) Appl. No.: 12/024,283

(22) Filed: Feb. 1, 2008

(65) Prior Publication Data

US 2008/0187832 A1    Aug. 7, 2008

(30) Foreign Application Priority Data

Feb. 1, 2007    (JP) .................................. 2007-022691

(51) Int. Cl.
| | |
|---|---|
| *H01M 4/02* | (2006.01) |
| *H01M 4/13* | (2010.01) |
| *H01M 4/58* | (2010.01) |
| *H01M 4/66* | (2006.01) |
| *H01M 4/68* | (2006.01) |
| *C23C 16/00* | (2006.01) |
| *C23C 16/24* | (2006.01) |
| *C23C 16/10* | (2006.01) |
| *C23C 14/10* | (2006.01) |
| *C23C 8/00* | (2006.01) |
| *C23C 10/10* | (2006.01) |
| *B05D 3/00* | (2006.01) |
| *B05D 3/06* | (2006.01) |
| *C08J 7/18* | (2006.01) |

(52) U.S. Cl. ...................... 429/218.1; 429/209; 429/233; 429/245; 427/255.11; 427/255.18; 427/255.23; 427/255.27; 427/255.28; 427/255.29; 427/255.37; 118/712

(58) Field of Classification Search .................. 429/209, 429/218.1, 233, 245; 427/255.11, 255.18, 427/255.23, 255.27, 255.28, 255.29, 255.37, 427/551, 585, 588; 118/712
See application file for complete search history.

(56) References Cited

U.S. PATENT DOCUMENTS 2,711,480 A * 6/1955 Friedman ......................... 378/50
(Continued)

FOREIGN PATENT DOCUMENTS

JP          2002-279974          9/2002
(Continued)

OTHER PUBLICATIONS

Ugaji et al., Machine translation of JP 2004063419 A, Feb. 2004.*

(Continued)

*Primary Examiner* — Basia Ridley
*Assistant Examiner* — Sean P Cullen
(74) *Attorney, Agent, or Firm* — McDermott Will & Emery LLP

(57) ABSTRACT

In a method for manufacturing a negative electrode for a battery, an active material layer including a metallic element M and an element A that is at least any one of oxygen, nitrogen, and carbon is formed on a current collector. This active material layer is irradiated with an X-ray and at least one of intensity of a $K\alpha$ ray of the element A and intensity of a $K\alpha$ ray of the metallic element M in fluorescent X-rays generated from the active material layer is measured.

3 Claims, 10 Drawing Sheets

U.S. PATENT DOCUMENTS

| | | | |
|---|---|---|---|
| 2,926,257 A * | 2/1960 | Friedman | 378/50 |
| 6,631,177 B1 * | 10/2003 | Haszler et al. | 378/50 |
| 7,192,673 B1 | 3/2007 | Ikeda et al. | |
| 2006/0029862 A1 * | 2/2006 | Koshina et al. | 429/218.1 |
| 2006/0099507 A1 * | 5/2006 | Kogetsu et al. | 429/218.1 |

FOREIGN PATENT DOCUMENTS

| | | |
|---|---|---|
| JP | 2003-017039 | 1/2003 |
| JP | 2003-017040 | 1/2003 |
| JP | 2004-063419 | 2/2004 |
| JP | 2005-196970 | 7/2005 |

OTHER PUBLICATIONS

Bito et al., Machine translation of JP 2005196970 A, Jul. 2005.*

* cited by examiner

METHOD FOR FORMING ACTIVE MATERIAL ON A CURRENT COLLECTOR OF NEGATIVE ELECTRODE USING FEEDBACK PROCESS WITH MEASURING COLLECTOR

BACKGROUND OF THE INVENTION

1. Field of the Invention

The present invention relates to a battery, a method and an apparatus for manufacturing a negative electrode of the battery. More particularly, the present invention relates to stabilization of performance of a non-aqueous electrolyte secondary battery using an active material having a high capacity density, for example, silicon (Si) or a Si compound, for a negative electrode.

2. Background Art

A non-aqueous electrolyte secondary battery represented by a lithium ion secondary battery has received attention as a high capacity power source mainly for portable equipment. Recently, in order to further increase the capacity of this battery, development of electrode materials (use of an active material having a high capacity density and reduction of sub-materials) and improvement (for example, thinning) of mechanical components have been actively carried out.

Especially, silicon (Si), tin (Sn), germanium (Ge) and a compound including such elements, as a negative electrode active material, are a high capacity density material having much higher theoretical capacity than graphite, and the study for using thereof is being carried out. As one example, a non-aqueous electrolyte secondary battery using a thin film of Si, which is formed on a current collector of a copper foil and the like by a sputtering method, as a negative electrode (see, for example, Japanese Patent Application Unexamined Publication No. 2002-83594), and a non-aqueous electrolyte secondary battery using a negative electrode in which an inclined columnar active material including Si is formed on a current collector by a gas phase method (see, for example, Japanese Patent Application Unexamined Publication No. 2005-196970) have been reported.

However, when a negative electrode active material of the compound is formed on a current collector by a gas phase method as in Japanese Patent Application Unexamined Publication No. 2005-196970, the composition of the negative electrode active material varies depending upon its manufacturing conditions. For example, when silicon oxide as a compound of a negative electrode active material is deposited and formed on a current collector by a vacuum vapor deposition method, the composition varies arbitrarily depending upon the amounts of Si and oxygen. When the composition of the negative electrode active material varies in this way, since an amount of lithium ions that can be absorbed by a unit weight of the negative electrode active material is changed, the capacity as a battery becomes unstable. For example, when the composition ratio of Si is reduced, the amount of absorbing lithium per unit weight of the negative electrode active material is reduced, so that the battery capacity is reduced. Furthermore, in this case, the amount of lithium to be absorbed by one atom of Si is relatively increased and lithium that cannot be absorbed at the time of charging may be deposited on a negative electrode as metallic lithium. The deposited metallic lithium is thermally unstable, which may deteriorate the safety. Therefore, it is necessary to prevent the composition of the negative electrode active material from being changed.

However, when a compound of the negative electrode active material is formed on a current collector by a gas phase method, for example, by a vapor deposition method, Si is evaporated from a vapor deposition crucible, the amount of Si as a raw material in the vapor deposition crucible is changed. Accordingly, the vaporization amount of Si is also changed. Thus, it is difficult to keep the manufacturing condition constant in the reactive gas phase method.

SUMMARY OF THE INVENTION

In a method for manufacturing a negative electrode for a battery in accordance with the present invention, an active material layer including a metallic element M and an element A that is at least any one of oxygen, nitrogen and carbon is formed on a current collector. This active material layer is irradiated with an X ray, and at least one of intensity of a Kα ray of the element A and intensity of a Kα ray of the metallic element M in fluorescent X rays generated from the active material layer is measured. According to this method, when a compound as a negative electrode active material having a high capacity density including the metallic element M and the element A that is at least any one of oxygen, nitrogen and carbon is formed on the current collector, it is possible to judge whether or not the composition of the active material layer is appropriate. Furthermore, by controlling a formation condition on the same line based on the measurement result, the change of the physical value is fed back to the formation condition and the composition of the active material layer can be made appropriate on the spot. Consequently, it is possible to stably manufacture a non-aqueous electrolyte secondary battery having less variation in properties such as capacity.

DETAILED DESCRIPTION OF THE INVENTION

Hereinafter, the embodiments of the present invention are described with reference to drawings. Note here that the present invention is not limited to contents described below as long as it is based on basic features described in this specification. In the below-mentioned description, a case in which silicon oxide ($SiO_x$) as a negative electrode active material capable of electrochemically absorbing and releasing lithium ions is formed on a copper current collector is mainly described. Note here that $SiO_x$ is a compound including silicon and oxygen but it may include impurities.

First Embodiment

Figure 1:
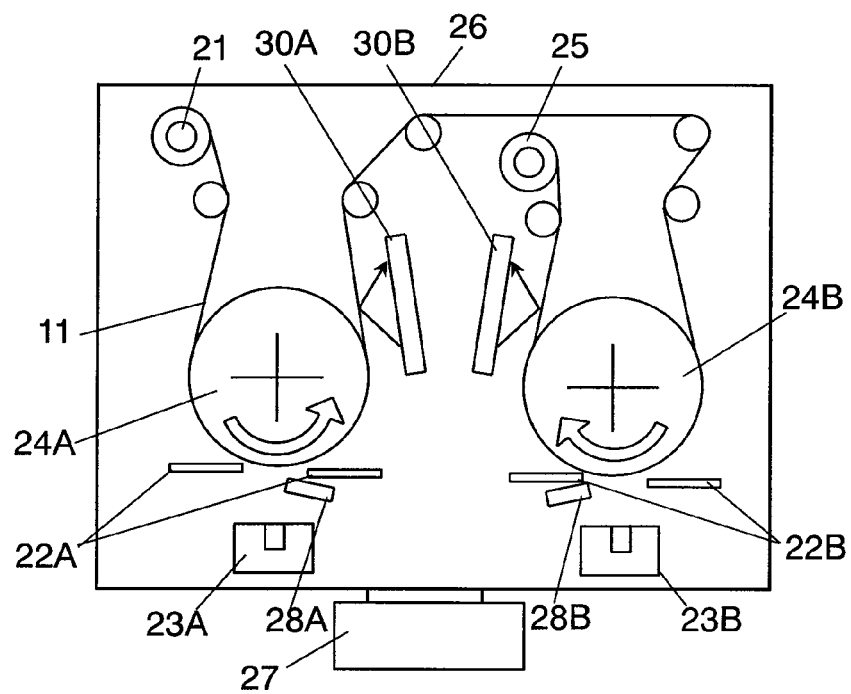
FIG. 1 is a schematic view showing a configuration of an apparatus for manufacturing a negative electrode for a non-aqueous electrolyte secondary battery in accordance with a first embodiment of the present invention.
Figure 2:
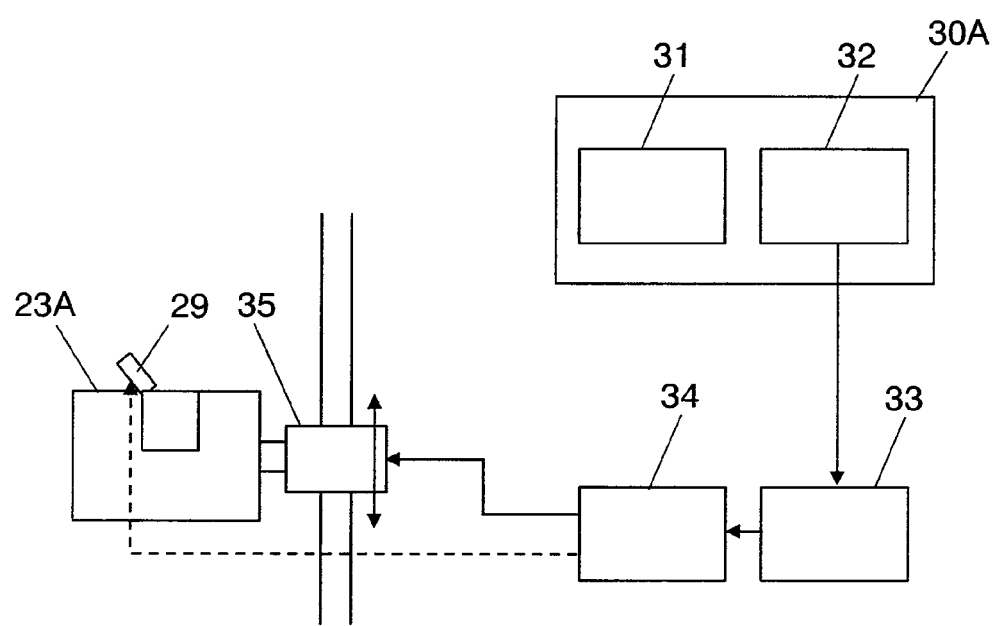
FIG. 2 is a block diagram showing a detail of a principal part thereof.
Figure 3:
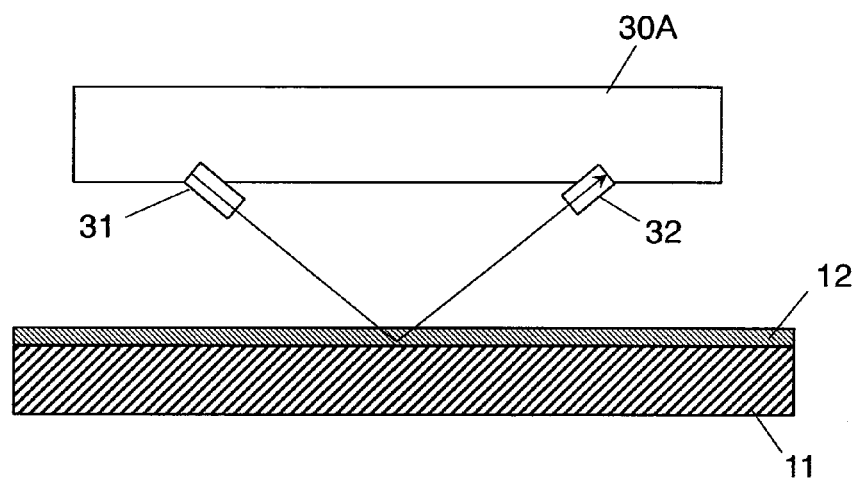
FIG. 3 is a view showing a configuration around a fluorescent X-ray analyzer that is a first measurement section of the manufacturing apparatus.

FIG. 1 is a schematic view showing a configuration of an apparatus for manufacturing a negative electrode for a non-aqueous electrolyte secondary battery in accordance with a first embodiment of the present invention. FIG. 2 is a block diagram showing a detail of a principal part thereof. FIG. 3 is a view showing a configuration around a fluorescent X-ray analyzer that is a first measurement section in FIG. 1.

In the manufacturing apparatus shown in FIG. 1, current collector 11 is sent from winding-out roll 21 to winding-up roll 25 by way of deposition rolls 24A and 24B. These rolls and vapor deposition units 23A and 23B are provided in vacuum chamber 26. The pressure inside vacuum chamber 26 is reduced by using vacuum pump 27. Vapor deposition units 23A and 23B are units each including a vapor deposition source, a crucible and an electron beam generator. A procedure for forming active material layer 12 as an active material layer of a negative electrode at one side on current collector 11 by using this apparatus as shown in FIG. 3 is described.

As current collector 11, a 30 μm-thick electrolytic copper foil is used. The inside of vacuum chamber 26 is an inactive atmosphere that is near vacuum. For example, the inside is an atmosphere of argon with a pressure of about $10^{-3}$ Pa. At the time of vapor deposition, an electron beam generated by the electron beam generator is polarized by a polarization yoke, and the vapor deposition source is irradiated with the electron beam. As the vapor deposition source, for example, a scrap material of Si (scrap silicon: purity 99.999%) generated when semiconductor wafers are manufactured is used. Meanwhile, oxygen with high purity (for example, 99.7%) is introduced into vacuum chamber 26 from oxygen nozzle 28A disposed in the vicinity of deposition roll 24A. Thus, Si vapor generated from vapor deposition unit 23A and oxygen introduced from nozzle 28A are reacted with each other, so that $SiO_x$ is deposited on current collector 11 and active material layer 12 is formed. That is to say, vapor deposition unit 23A, nozzle 28A, and deposition roll 24A constitute a formation section for forming active material layer 12 made of $SiO_x$ on the surface of current collector 11 by a gas phase method using Si in an atmosphere including oxygen.

Note here that an opening of mask 22A is provided so that Si vapor is applied on the surface of current collector 11 as vertically as possible. Furthermore, by opening and closing mask 22A, an exposed portion of current collector 11, on which active material layer 12 is not formed, is formed.

Thereafter, current collector 11 is sent to deposition roll 24B. Oxygen is introduced into vacuum chamber 26 from oxygen nozzle 28B while silicon vapor is generated from vapor deposition unit 23B, so that a negative electrode active material layer is formed on the other surface of the current collector. With this method, a negative electrode active material layer made of $SiO_x$ is formed on both surfaces of current collector 11.

Next, a configuration for keeping the value x of $SiO_x$ constant, that is, a configuration for matching the composition of the active material layer to a predetermined value is described. In the below-mentioned description, active material layer 12 that is one of the active material layers is mainly described.

Fluorescence X-ray analyzer (XRF) 30A as a first measurement section includes X-ray generating section 31 and measurement section 32 as shown in FIG. 3. X-ray generating section 31 irradiates active material layer 12 with X-ray and measurement section 32 receives fluorescent X-ray generated from active material layer 12. XRF 30B also has a similar configuration and analyzes an active material layer provided on the opposite side of active material layer 12 of current collector 11. Measurement section 32 measures at least one of intensity of fluorescent X-ray (OKα) from oxygen contained in $SiO_x$ of active material layer 12 and intensity of fluorescent X-ray (SiKα) from silicon contained in $SiO_x$ of active material layer 12.

Figure 4:
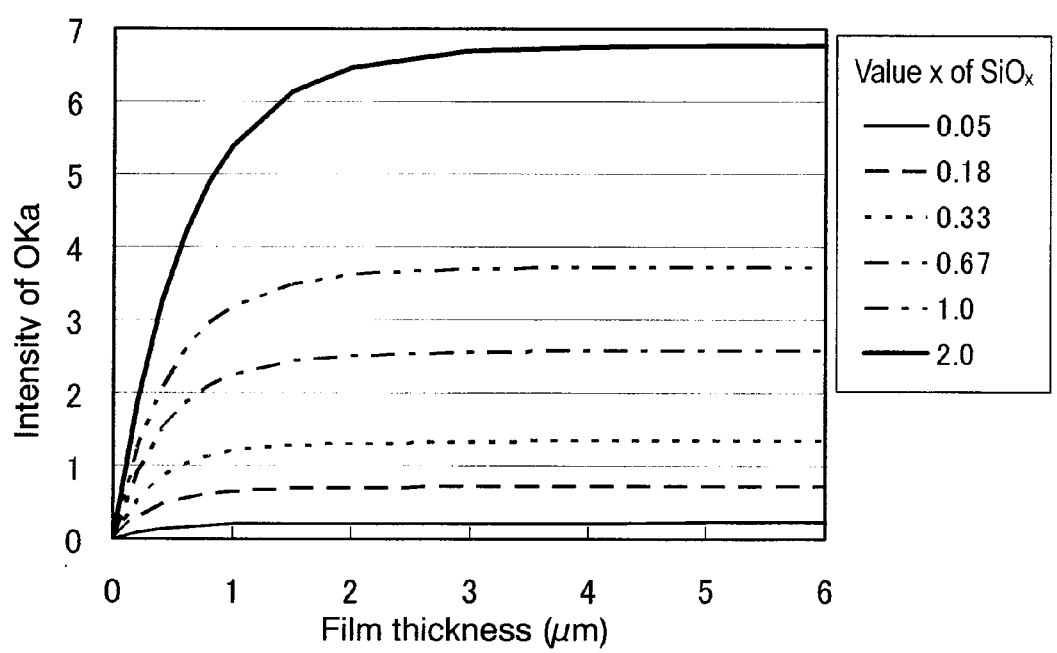
FIG. 4 is a graph showing a relation between a thickness of an active material layer including $SiO_x$ and intensity of $OK\alpha$.

FIG. 4 is a graph obtained by a simulation, showing a relation between the thickness of active material layer 12 including $SiO_x$ and the intensity of OKα. Each line has a different value x. In the simulation at this time, an incident angle of X-ray is 65°, an output angle of fluorescent X-ray is 40°, an X-ray excitation voltage is 50 kV, a density of $SiO_x$ is 2.2 g/cm$^3$, and a thickness of the current collector is 35 μm. As is apparent from FIG. 4, by comparison under the same thickness, the intensity of OKα is dependent upon the value X. Furthermore, the intensity of OKα is substantially constant when the thickness of active material layer 12 is 3 μm or more and the value X is fixed. This is because oxygen is a relatively light element and OKα generated in a position deeper than 3 μm of the surface layer is absorbed inside, so that it is not released to the outside. Thus, when active material layer 12 is formed to the thickness of 3 μm or more, it is possible to estimate the value x of $SiO_x$ constituting active material layer 12 from the intensity of OKα without considering the thickness of active material layer 12.

Alternatively, when the thickness of active material layer 12 is measured by, for example, a method described in the below-mentioned third embodiment, and thereby the intensity of OKα is corrected, the value x of SiO$_x$ can be estimated even when the thickness of active material layer 12 is less than 3 μm.

Furthermore, when a compound such as SiO$_x$ including a metallic element M and an element A that is at least one of oxygen, nitrogen and carbon is used as an active material, the Kα ray intensity of the metallic element M is dependent upon the composition ratio of the element A and the thickness of active material layer 12. Therefore, as in the above description, when the thickness of active material layer 12 is measured and the Kα ray intensity of the metallic element M is measured, the composition of this active material can be estimated. When Si, tin (Sn), germanium (Ge), and the like, are employed as the metallic element M as described in the below-mentioned second embodiment, this procedure can be applied.

Figure 5:
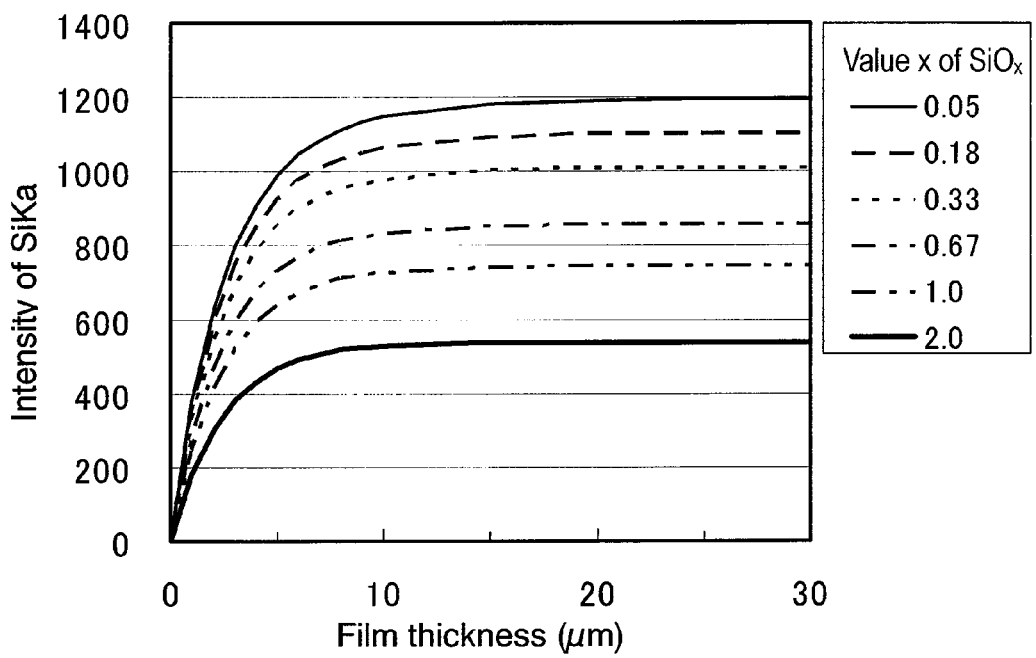
FIG. 5 is a graph showing a relation between a thickness of an active material layer including $SiO_x$ and intensity of $SiK\alpha$.

Next, with reference to FIG. 5, a case of estimating the value x of SiO$_x$ constituting active material layer 12 from the intensity of SiKα is described. FIG. 5 is a graph showing the relation between the thickness of active material layer 12 including SiO$_x$ and the intensity of SiKα. Each line has a different value x. The conditions of simulation at this time are the same as mentioned above. As is apparent from FIG. 5, the intensity of SiKα is substantially constant when the thickness of active material layer 12 is 30 μm or more and the value X is fixed. Since Si is a heavier element as compared with 0, SiKα generated in a position to a 30 μm surface layer is not absorbed inside but released to the outside. Therefore, when active material layer 12 is formed to the thickness of 30 μm or more, the value x of SiO$_x$ constituting active material layer 12 can be estimated from the intensity of SiKα. Furthermore, also in this case, the thickness of active material layer 12 can be measured and thereby the intensity of SiKα can be corrected. Accordingly, even when the thickness of active material layer 12 is less than 30 μm, the value x of SiO$_x$ can be estimated.

Thus, when the thickness of active material layer 12 is 3 μm or more, the intensity of OKα ray is not affected by the thickness of active material layer 12. Furthermore, when the thickness of active material layer 12 is 30 μm or more, the intensity of SiKα ray is not affected by the thickness of active material layer 12. Consequently, without making a correction based on the thickness, it is possible to estimate the oxidation number of silicon in a compound including silicon and oxygen.

Next, a method of estimating the value x of SiO$_x$ at the intensity of OKα is described. Note here that the same is true to a procedure in which value x of SiO$_x$ is estimated at the intensity of SiKα.

As shown in FIG. 2, the intensity of OKα or SiKα measured by measurement section 32 is sent to calculation section 33 as a first calculation section. Calculation section 33 stores the relation (calibration curve) between the intensity of OKα and the value x, and calculates the value x based on the data sent from measurement section 32. That is to say, calculation section 33 estimates the oxidation number of silicon in SiO$_x$ from the intensity of the measured OKα ray. This calculation result is sent to control section 34. Control section 34 controls position adjustment section 35. Position adjustment section 35 controls a generation rate of silicon vapor by controlling the distance from vapor deposition unit 23A to deposition roll 24A. Thus, the generation rate of silicon vapor is controlled and oxygen is supplied from nozzle 28A at a constant flow rate, thereby enabling the value X to be controlled. Alternatively, the generation rate of silicon vapor may be controlled by controlling the output from electron beam gun 29 with control section 34.

As mentioned above, in the apparatus for manufacturing a negative electrode for a non-aqueous electrolyte secondary battery in accordance with this embodiment, calculation section 33 estimates the oxidation number of silicon in SiO$_x$ from the intensity of OKα measured in XRF 30A, and control section 34 feeds back the estimated oxidation number of silicon to the formation section so that the oxidation number of silicon in active material layer 12 is matched to a predetermined value. That is to say, control section 34 adjusts the formation condition of SiO$_x$. Therefore, the value x of SiO$_x$ constituting active material layer 12 is kept to be substantially constant.

In the above description, control section 34 controls the generation rate of silicon vapor. However, in accordance with the change of the vapor deposition conditions, for example, the change in the pressure inside vacuum chamber 26, control section 34 may control the flow rate of oxygen introduced from nozzle 28A. Furthermore, if control section 34 can control the manufacturing condition of active material layer 12, it is not necessary to estimate the oxidation number of silicon. Parameters relating to the oxidation number, for example, data themselves sent from measurement section 32 may be used.

Figure 6:
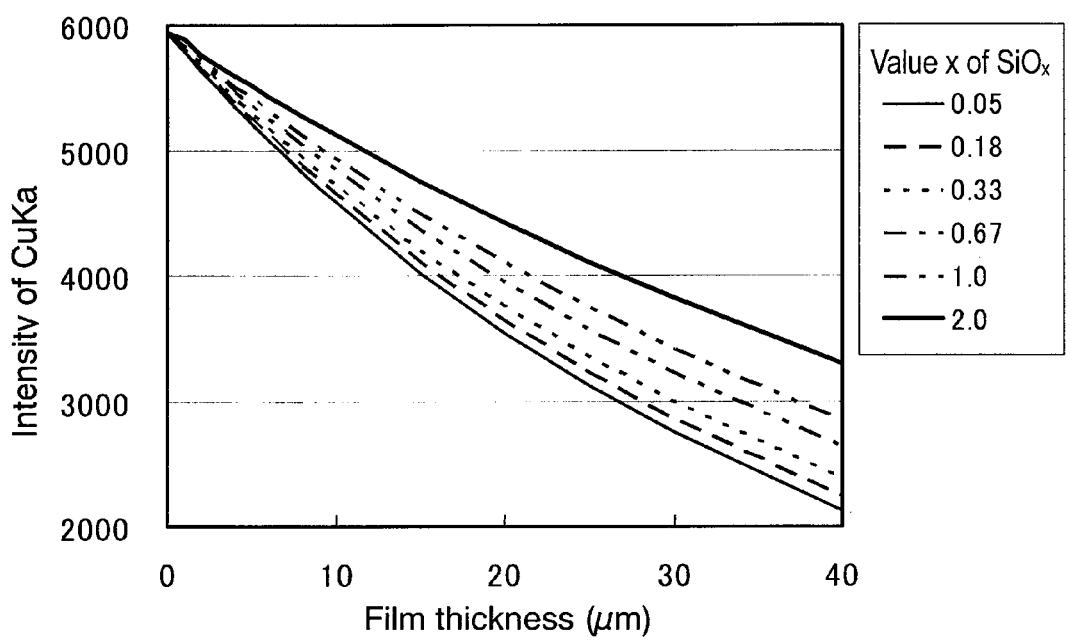
FIG. 6 is a graph showing a relation between a deposit amount of an active material layer including $SiO_x$ per unit area of the current collector and intensity of $CuK\alpha$.

As mentioned above, even when the oxidation number of silicon is controlled, for example, when the rotation speed of winding-out roll 21 is changed or when relatively long current collector 11 is set to winding-out roll 21, the sending speed of current collector 11 may be changed and the deposit amount of SiO$_x$ per unit area of current collector 11 may be changed. When the deposit amount of SiO$_x$ is changed, the capacity of the negative electrode per unit area is changed, which is not preferable from the viewpoint of battery property and safety. Then, a configuration for controlling the deposit amount per unit area of current collector 11 is described with reference to FIGS. 1, 3 and 6. FIG. 6 is a graph showing the relation (calibration curve) between the deposit amount of active material layer 12 made of SiO$_x$ per unit area of current collector 11 and the intensity of CuKα. Note here that the measurement conditions are the same as those of FIG. 4.

In the description, measurement section 32 shown in FIG. 3 measures the intensity of OKα. However, it also may measure the intensity of CuKα generated from current collector 11. Since copper is a heavier element than oxygen and silicon, even when active material layer 12 is present on the surface of current collector 11, CuKα cannot be absorbed by active material layer 12 and released to the outside. At this time, as shown in FIG. 6, the intensity (or attenuation amount) of CuKα is dependent upon the deposit amount of active material layer 12 per unit area of current collector 11 and the oxidation number of silicon. Since calculation section 33 estimates the oxidation number of silicon from the intensity of OKα, when the relation shown in FIG. 6 is stored, from the intensity of CuKα, the deposit amount per unit area of current collector 11 can be calculated.

In this way, current collector 11 is made of copper, measurement section 32 of the first measurement section measures the attenuation amount of the CuKα ray in the generated fluorescent X-rays. The deposit amount of SiO$_x$ per unit area of current collector 11 is calculated from the measured attenuation amount by calculation section 33, and the calculated deposit amount of SiO$_x$ is fed back to the formation section of control section 34. Thereby, the deposit amount of SiO$_x$ can be matched to a predetermined value. That is to say, control section 34 adjusts the formation condition of SiO$_x$. At this time, for example, control section 34 controls the rotation speeds of winding-out roll 21 and winding-up roll 25. Furthermore, if control section 34 can control the manufacturing condition of active material layer 12, it is not necessary to calculate the deposit amount of $SiO_x$. Parameters relating to the deposit amount, for example, data themselves sent from measurement section 32 may be used.

As mentioned above, according to the apparatus for manufacturing a negative electrode for a non-aqueous electrolyte secondary battery in accordance with this embodiment, the value x of $SiO_x$ and the deposit amount per unit area of current collector 11 can be kept substantially constant. Note here that control section 34 may control only the value x of $SiO_x$, and may only inform the deposit amount per unit area of current collector 11. For example, control section 34 may display the deposit amount per unit area of current collector 11 on a display such as liquid crystal panel, or issue an alarm when the deposit amount is beyond a predetermined range. Thus, an operator can judge whether or not the deposit amount of a manufacturing lot is in an appropriate range.

When Si is used as a negative electrode active material, oxygen may not be introduced from nozzle 28A. Alternatively, in FIG. 1, nozzle 28A may not be provided. In this case, since active material layer 12 is formed of only Si, the composition is known. On the other hand, since the deposit amount per unit area of current collector 11 can be estimated from the attenuation amount of CuKα generated from current collector 11, it is effective in a case in which active material layer 12 is formed of only Si. Alternatively, the same is true to the case in which active material layer 12 is formed of a negative electrode active material whose composition is fixed by some methods. In any case, when the relation between the attenuation amount of CuKα by materials constituting active material layer 12 and the deposit amount per unit area of current collector 11 is examined in advance and the data are stored in calculation section 33, the deposit amount can be calculated.

That is to say, in this case, when a formation section forms an active material layer, which includes silicon or silicon oxide capable of electrochemically absorbing and releasing lithium ions, where composition of the silicon oxide is known, on the surface of copper current collector 11 by a gas phase method using silicon in the atmosphere including oxygen or in the atmosphere including an inactive gas, XRF 30A as a first measurement section irradiates active material layer 12 on current collector 11 with X-rays and measures the attenuation amount of CuKα ray in fluorescent X-ray generated from current collector 11. Calculation section 33 calculates the deposit amount of silicon or silicon oxide per unit area of current collector 11 from the attenuation amount measured by XRF 30A. Control section 34 feeds back the deposit amount of the calculated silicon or silicon oxide to the formation section and matches the deposit amount of silicon or silicon oxide to a predetermined value.

In this embodiment, when the deposit amount of active material layer 12 is measured, the attenuation amount of CuKα ray in the fluorescent X-rays generated from current collector 11 is measured. However, even when current collector 11 is formed of other heavy metals, the deposit amount of active material layer 12 can be measured. An example of metals that are stable in a potential region in which a negative electrode is used may include nickel (Ni), titanium (Ti) and iron (Fe). Also when current collector 11 is formed of these metals, the deposit amount of active material layer 12 can be similarly measured.

The negative electrode produced as mentioned above is cut into a predetermined dimension, and if necessary, a lead is joined to the exposed portion of current collector 11 formed by using mask 22A. The negative electrode and the positive electrode, which is capable of absorbing and releasing lithium ions, are wound facing each other via a separator. Then, a non-aqueous electrolyte is intervened in the negative electrode and the positive electrode so as to configure a cylindrical or rectangular non-aqueous electrolyte secondary battery.

Figure 7:
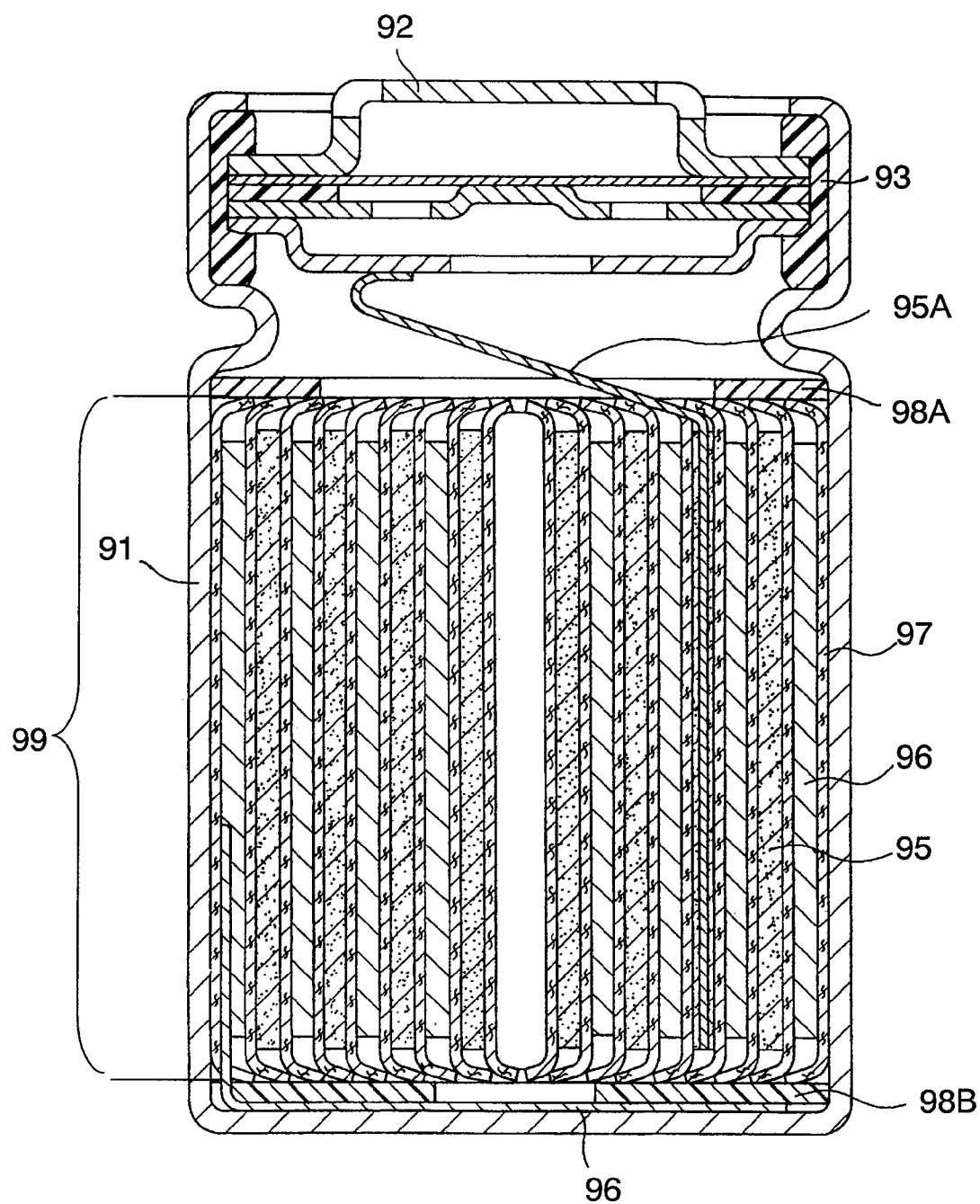
FIG. 7 is a longitudinal sectional view showing a non-aqueous electrolyte secondary battery according to the exemplary embodiments of the present invention.

FIG. 7 is a longitudinal sectional view showing a non-aqueous electrolyte secondary battery in accordance with the present embodiment. Herein, a cylindrical battery is described as an example. This non-aqueous electrolyte secondary battery includes metallic case 91 and electrode group 99 contained in case 91. Case 91 is made of, for example, stainless steel or nickel-plated iron. Electrode group 99 is formed by winding positive electrode 95 and negative electrode 96 via separator 97 in a spiral shape. Upper insulating plate 98A is disposed in the upper part of electrode group 99 and lower insulating plate 98B is disposed in the lower part of electrode group 99. The open end of case 91 is sealed by caulking case 91 to sealing plate 92 via gasket 93. Furthermore, one end of lead 95A made of aluminum (Al) is attached to positive electrode 95. Another end of lead 95A is coupled to sealing plate 92 that also works as a positive terminal. One end of lead 96A made of nickel (Ni) is attached to negative electrode 96. Another end of lead 96A is coupled to case 91 that also works as a negative terminal. Electrode group 99 is impregnated with a nonaqueous electrolyte (not shown). That is to say, the nonaqueous electrolyte exists between positive electrode 95 and negative electrode 96.

Alternatively, current collector 11 only one side of which is provided with active material layer 12 is punched out in a predetermined dimension and it may be used as a negative electrode of a coin type battery. Thus, the form of the battery using a negative electrode formed by the manufacturing apparatus according to this embodiment is not particularly limited. The same is true in the below-mentioned embodiments.

When the measurement of active material layer 12 is formed of $SiO_x$ including two components, Si and O, the measured attenuation amount of CuKα ray is determined only by the value x. Therefore, for example, the thickness of active material layer 12 is measured by the procedure shown in the below-mentioned third embodiment, it is possible to estimate the composition of the active material from the thickness of active material layer 12 and the intensity of the CuKα ray. Thus, when the thickness and the intensity of fluorescent X-ray are carried out, regardless of the thickness of active material layer 12, by using the generation intensity of fluorescent X-ray of SiKα and OKα or the attenuation amount of fluorescent X-ray of CuKα, the composition of active material layer 12 can be estimated.

Second Embodiment

Figure 8:
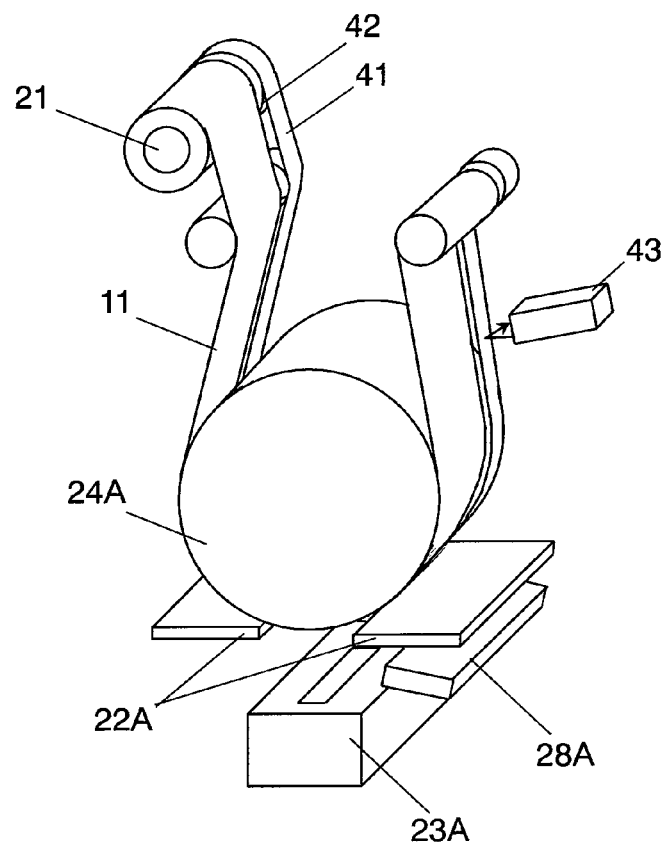
FIG. 8 is a partially perspective view showing an apparatus for manufacturing a negative electrode for a non-aqueous electrolyte secondary battery in accordance with a second embodiment of the present invention.
Figure 9:
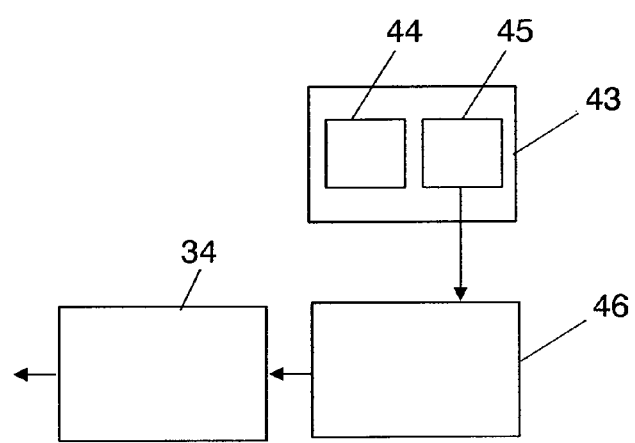
FIG. 9 is a block diagram showing a detail of a principal part thereof.

FIG. 8 is a partially perspective view showing an apparatus for manufacturing a negative electrode for a non-aqueous electrolyte secondary battery in accordance with a second embodiment of the present invention and shows around deposition roll 24A. FIG. 9 is a block diagram showing a detail of a principal part thereof. In this embodiment, a configuration of a formation section including deposition roll 24A, winding-out roll 21, nozzle 28A, vapor deposition unit 23A, and the like, is the same as that in FIG. 1. In this embodiment, as the first measurement section, instead of XRF 30A, Fourier transform infrared spectroscopic analyzer (FTIR) 43 is provided. Furthermore, measuring winding-out roll 42 for supplying measuring current collector 41 is provided. Measuring winding-out roll 42 rotates faster than winding-out roll 21. That is to say, measuring current collector 41 is sent faster than current collector 11. A formation section deposits $SiO_x$ on current collector 11 and measuring current collector 41 at the same time. FTIR 43 analyzes $SiO_x$ formed on measuring current collector 41.

As shown in FIG. 9, FTIR 43 includes infrared irradiation section 44 and measurement section 45. Infrared irradiation section 44 irradiates an active material layer for measuring on measuring current collector 41 with an infrared ray, and measurement section 45 receives an infrared ray reflected from the active material layer. Measurement section 45 measures a wave number of characteristic absorption of oxygen and silicon included in $SiO_x$ of the active material layer.

Figure 10:
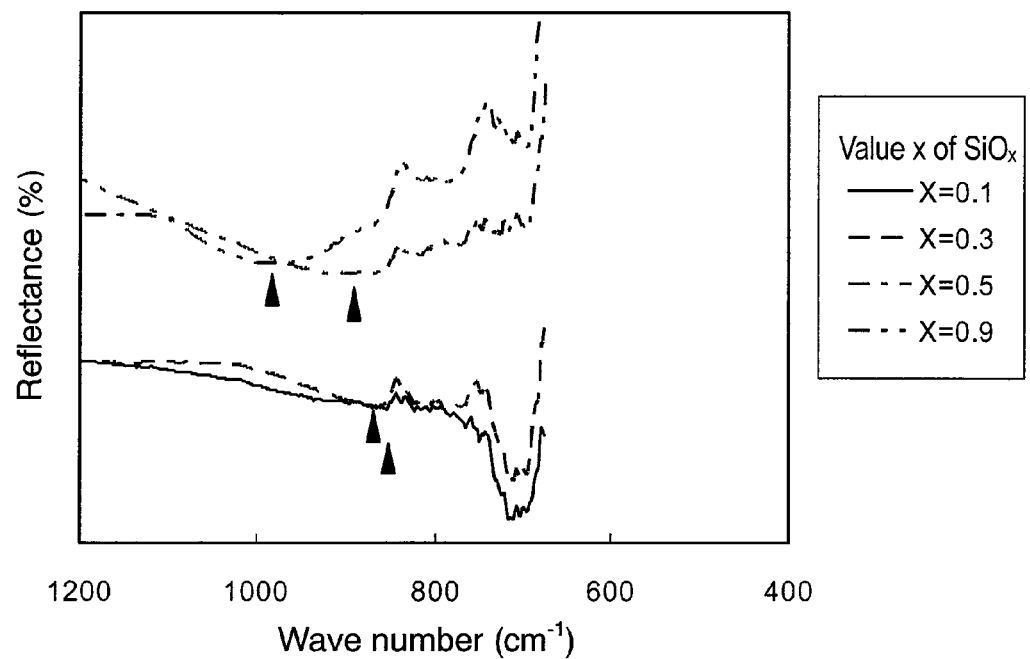
FIG. 10 is a graph showing spectra of an infrared ray reflected from a layer of $SiO_x$ having different value x.

FIG. 10 is a graph showing spectra of infrared rays reflected from a layer of $SiO_x$ in which the value x is different. Infrared irradiation section 44 has a light source and an interferometer, and measurement section 45 has a photo-receiving sensor and an operation section. The measurement is carried out at a resolution of 16 $cm^{-1}$. The wave number of characteristic absorption of oxygen and silicon is observed around 1080 $cm^{-1}$ when value x is 2 ($SiO_2$). Then, the value x becomes smaller, the wave number is shifted to the side of lower wave number. This is because the binding force between oxygen and silicon is changed by the oxidation number of silicon. Therefore, by measuring the shift of the characteristic absorption, the value x can be estimated.

Note here that the infrared ray is reflected by the surface of the current collector beneath the active material layer. However, since the intensity at which the infrared ray passes through the active material layer is not so large, even when active material layer 12 is irradiated with an infrared ray, the reflection intensity is weak and the wave number of the characteristic absorption cannot be measured precisely. Therefore, infrared irradiation section 44 irradiates measuring current collector 41, which is sent faster than current collector 11, with an infrared ray. Thus, it is possible to estimate the composition of active material layer 12 indirectly. Thus, the active material layer for measuring is formed to the thickness capable of reflecting the infrared ray.

As shown in FIG. 9, the wave number of the characteristic absorption of oxygen and silicon measured in measurement section 45 is sent to calculation section 46 as a first calculation section. Calculation section 46 stores the relation between the wave number of the characteristic absorption and the value x, and calculates the value x based on the data sent from measurement section 45. That is to say, calculation section 46 estimates the oxidation number of silicon in $SiO_x$ from the wave number of the characteristic absorption. This calculation result is sent to control section 34. Then, control section 34 controls the generation rate of a silicon vapor in the same manner as in the first embodiment.

As mentioned above, in an apparatus for manufacturing a negative electrode for a non-aqueous electrolyte secondary battery in accordance with this embodiment, from the wave number of the characteristic absorption measured by FTIR 43, calculation section 46 estimates the oxidation number of silicon in $SiO_x$, and control section 34 feeds back the estimated oxidation number of silicon to the formation section so as to match the oxidation number of silicon in active material layer 12 to a predetermined value. That is to say, control section 34 adjusts the formation condition of $SiO_x$. Therefore, the value x of $SiO_x$ constituting active material layer 12 can be kept substantially constant. If control section 34 can control the manufacturing condition of active material layer 12, it is not necessary to estimate the oxidation number of silicon. Parameters relating to the oxidation number, for example, data themselves sent from measurement section 45 may be used.

When the value x is estimated by using infrared spectroscopy, it is preferable to employ a highly sensitive reflection method (RAS method: Reflection Absorption Spectroscopy). The RAS method is a technique for measuring absorption of a coated film on the metal substrate with high sensitivity. In this method, an infrared ray is irradiated at 70 to 85° with respect to a normal line of the substrate. The reflectance of incident light on the surface of the substrate has dependence on an incident angle. The reflection property of a parallel direction component and that of a perpendicular direction component are different from each other with respect to a plane made by a normal line and the incident light on the substrate. The electric fields in the parallel direction component on the reflection surface are strengthened with each other while those in the perpendicular direction component are cancelled to each other so that the electric fields become zero. Then, when polarized light is applied so that only the parallel direction component is detected, polarized light in the perpendicular direction can be ignored. Then, apparently, the reflectance is increased.

Figure 11A:
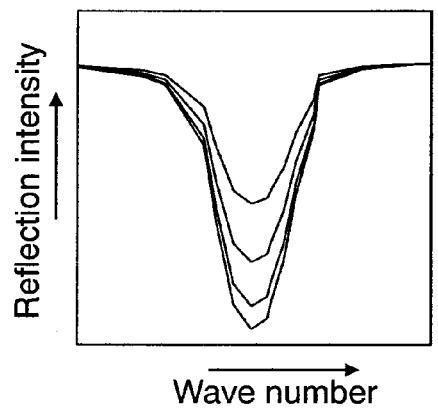
FIG. 11A is a spectral atlas showing characteristic absorption of oxygen—silicon of samples having different deposit amounts of $SiO_x$ per unit area of a current collector.
Figure 11B:
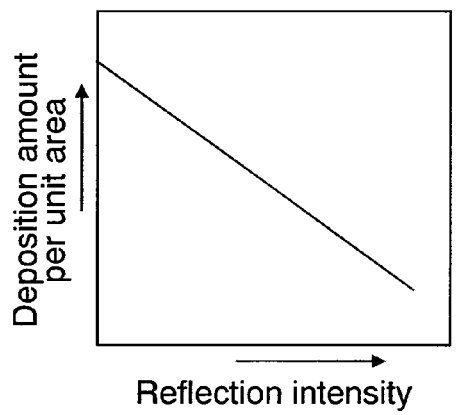
FIG. 11B is a view showing a relation between a deposit amount of $SiO_x$ per unit area of a current collector and reflection intensity of the characteristic absorption.

Note here that as in the present embodiment, by using infrared spectroscopy, the deposit amount of active material layer 12 per unit area of current collector 11 can be estimated. Hereinafter, the method is described. FIG. 11A is a spectral atlas showing characteristic absorption of oxygen—silicon according to samples having different deposit amounts of $SiO_x$ per unit area of current collector 11. FIG. 11B is a graph showing a relation between a deposit amount of $SiO_x$ per unit area of current collector 11 and the reflection intensity in the characteristic absorption. As is apparent from FIGS. 11A and 11B, the reflection intensity in the characteristic absorption is correlated to the deposit amount of $SiO_x$ per unit area of current collector 11. Therefore, when the reflection intensity in the characteristic absorption is measured, by using a calibration curve as shown in FIG. 11B, the deposit amount of $SiO_x$ per unit area of current collector 11 can be estimated.

Thus, measurement section 45 as the first measurement section measures the reflection intensity of the wave number of the characteristic absorption in the reflected infrared ray. Calculation section 46 calculates the deposit amount of $SiO_x$ per unit area of measuring current collector 41 from the measured reflection intensity. Furthermore, from the ratio of the sending speed of current collector 11 and the sending speed of the measuring current collector 41, the deposit amount of $SiO_x$ per unit area of current collector 11 is calculated. Then, the calculated deposit amount of $SiO_x$ is fed back to the formation section of control section 34, and thereby, deposit amount of $SiO_x$ can be matched to a predetermined value. That is to say, control section 34 adjusts the formation condition of $SiO_x$. If control section 34 can control the manufacturing condition of active material layer 12, it is not necessary to estimate the deposit amount of $SiO_x$. Parameters relating to the oxidation number, for example, data themselves sent from measurement section 45 may be used.

Thus, also with the apparatus for manufacturing a negative electrode for a non-aqueous electrolyte secondary battery in this embodiment, the value x of $SiO_x$ and the deposit amount per unit area of current collector 11 can be kept substantially constant. In the above description, by using the reflection intensity of characteristic absorption of an infrared ray, the deposit amount of $SiO_x$ per unit area is calculated. However, instead of the reflection intensity, transmittance and absorbance may be used.

A method for estimating the composition and deposit amount of active material layer 12 by using an infrared absorption property as in this embodiment can be applied to a case in which in addition to $SiO_x$, materials having absorption in an infrared region, for example, $SiC_x$ ($0.1 \leq x \leq 1.0$), $SiN_x$ ($0.2 \leq x \leq 1.0$), $SnO_x$ ($1.0 \leq x \leq 2.0$), $GeO_x$ ($0.1 \leq x \leq 2.0$), and the like, are used as a negative electrode active material. In order to deposit a negative electrode active material of nitride such as $SiN_x$ on current collector 11, nitrogen instead of oxygen is introduced from nozzle 28A. In order to deposit a negative electrode active material of carbide such as $SiC_x$ on current collector 11, carbohydrate such as methane instead of oxygen is introduced from nozzle 28A. These can be used as an active material of the negative electrode for a non-aqueous electrolyte secondary battery. However, a technique of this embodiment can be applied in the case in which a negative electrode active material for a non-aqueous electrolyte primary battery or a negative electrode active material for an aqueous electrolyte battery is formed on the current collector as long as the material has absorption in the infrared region. Furthermore, the materials for current collector 11 and measuring current collector 41 are not particularly limited as long as they reflect an infrared ray. Similar to the first embodiment, in addition to Cu, for example, Ni, Ti, Fe, and the like, can be used. Furthermore, as a technique for feeding back the composition and the deposit amount of the active material to the formation process, in addition to the case in which an active material layer is formed by a gas phase method, it is also possible to use a case in which an active material layer made of oxide or a conductive polymer material is formed by, for example, a liquid phase method such as electrolysis. This case can be also reflected to the formation conditions. When the conductive polymer material is formed, for example, polymerization degree can be matched to a predetermined value.

In this embodiment, an active material layer for measuring that is formed thinner than active material layer 12 is irradiated with an infrared ray. However, if active material layer 12 has a thickness capable of reflecting an infrared ray, irradiation of an infrared ray may be carried out to active material layer 12 directly so as to measure the composition and deposit amount.

Third Embodiment

Figure 12:
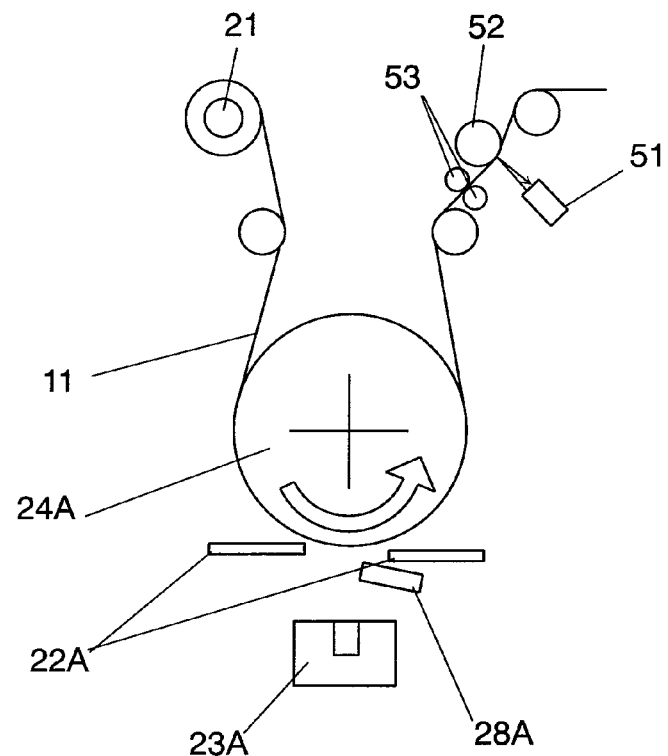
FIG. 12 is a partial plan view showing an apparatus for manufacturing a negative electrode for a non-aqueous electrolyte secondary battery in accordance with a third embodiment of the present invention.
Figure 13:
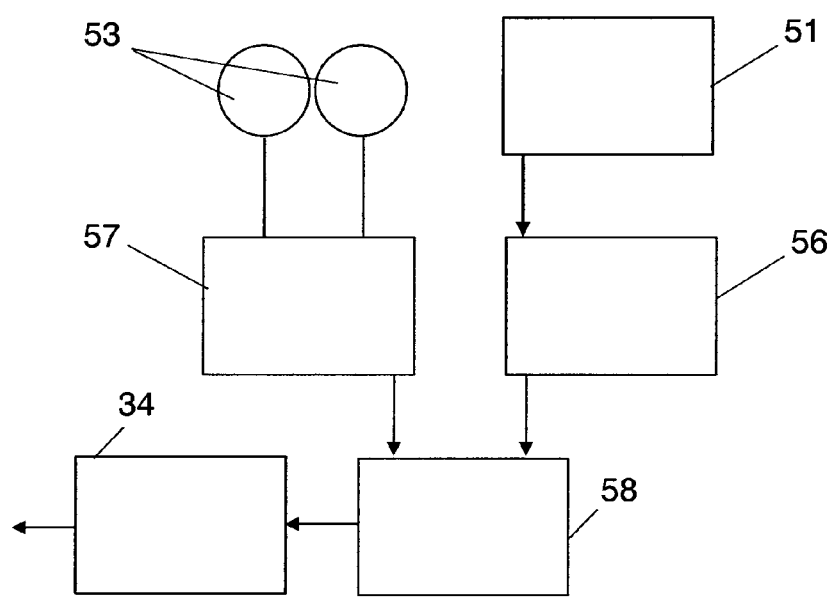
FIG. 13 is a block diagram showing a detail of a principal part thereof.

FIG. 12 is a partial plan view showing an apparatus for manufacturing a negative electrode for a non-aqueous electrolyte secondary battery in accordance with a third embodiment of the present invention and shows around deposition roll 24A. FIG. 13 is a block diagram showing a detail of a principal part thereof. In this embodiment, a configuration of a formation section including deposition roll 24A, winding-out roll 21, nozzle 28A and vapor deposition unit 23A, and the like, is the same as that in FIG. 1. In this embodiment, instead of XRF 30A, a first measurement section for measuring the thickness of active material layer 12, which includes base roll 52, thickness measurement device 51 and operation section 56, and a second measurement section for measuring the resistance of active material layer 12, which includes a pair of resistance measurement rolls 53 and resistance measurement device 57 are provided.

When current collector 11 passes on base roll 52, thickness measurement device 51, which includes a laser displacement gauge, irradiates current collector 11 with laser beam. Then, thickness measurement device 51 measures times until the irradiated laser light is reflected when only current collector 11 that is not provided with active material layer 12 is allowed to pass and when current collector 11 that is provided with active material layer 12 is allowed to pass, respectively. As shown in FIG. 13, thickness measurement device 51 sends measured time to operation section 56. Operation section 56 calculates the thickness of active material layer 12 based on the difference between a reflecting time when only current collector 11 that is not provided with active material layer 12 is allowed to pass and a reflecting time when current collector 11 that is provided with active material layer 12 is allowed to pass. That is to say, operation section 56 calculates the thickness of active material layer 12 by storing the thickness of current collector 11 in advance.

Furthermore, resistance measurement rolls 53 are coupled to resistance measurement device 57, respectively. When current collector 11 provided with active material layer 12 is allowed to pass between resistance measurement rolls 53, resistance measurement device 57 measures the resistance (resistivity) between resistance measurement rolls 53. At this time, resistance measurement device 57 calculates the resistance from a current value when constant voltage 10V is applied. Calculation section 58 as a first calculation section calculates a volume resistivity of active material layer 12 by using the thickness of active material layer 12 calculated in operation section 56, the resistance value measured by resistance measurement device 57, and a previously measured contact area between resistance measurement roll 53 and active material layer 12. In this case, the resistivity of current collector 11 is stored in calculation section 58 in advance, thereby calculating the volume resistivity of active material layer 12.

Figure 14:
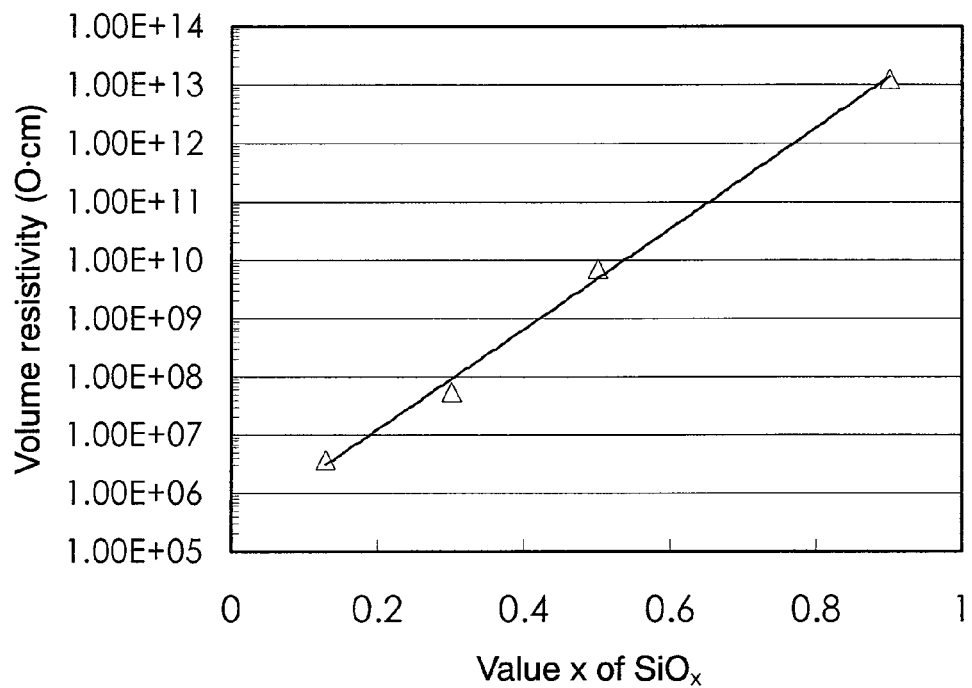
FIG. 14 is a graph showing a relation between the value x in $SiO_x$ constituting an active material layer and a logarithm of volume resistivity.

FIG. 14 is a graph (calibration curve) showing a relation between the value x in $SiO_x$ constituting active material layer 12 and a logarithm of the volume resistivity. As is apparent from FIG. 14, there is a linear relation therebetween. Calculation section 58 stores the data and estimates the value x from the volume resistivity of active material layer 12 calculated by using the data as mentioned above. This calculated result is sent to control section 34. Then, control section 34 controls the generation rate of silicon vapor as in the first embodiment.

As mentioned above, in the apparatus for manufacturing a negative electrode for a non-aqueous electrolyte secondary battery, calculation section 58 estimates the oxidation number of silicon in $SiO_x$ from the thickness of active material layer 12 calculated by thickness measurement device 51 and operation section 56 and the resistance value measured by resistance measurement device 57. Control section 34 feeds back the estimated oxidation number of silicon to the formation section and matches the oxidation number in silicon of active material layer 12 to a predetermined value. That is to say, control section 34 adjusts the formation condition of $SiO_x$. Therefore, the value x of $SiO_x$ constituting active material layer 12 is kept substantially constant. If control section 34 can control the manufacturing condition of active material layer 12, it is not necessary to estimate the oxidation number of silicon. Parameters relating to the oxidation number, for example, data themselves sent from thickness measurement device 51 and resistance measurement device 57 may be used.

In this embodiment, the formation section forms active material layer 12 in a form of a non-porous film, and thickness measurement device 51 and operation section 56 calculate the thickness of active material layer 12. Therefore, calculation section 58 can calculate the deposit amount of $SiO_x$ per unit area of current collector 11. Then, control section 34 feeds back the calculated deposit amount of $SiO_x$ to the formation section, and thereby the deposit amount of $SiO_x$ can be matched to a predetermined value. That is to say, control section 34 adjusts the formation condition of $SiO_x$. If control section 34 can control the manufacturing condition of active material layer 12, it is not necessary to calculate the deposit amount of $SiO_x$. Parameters relating to the oxidation number, for example, data themselves sent from thickness measurement device 51 may be used.

In the method of this embodiment, since a composition of active material layer 12 is estimated from the thickness and resistivity, by examining the relation between the volume resistivity and the composition in advance, the method can be employed regardless of the negative electrode active materials to be used. That is to say, the method is also effective when elemental substance of Si, Sn and Ge, or oxide, carbide, nitride, and the like, thereof are used for the negative electrode active material. Furthermore, a material of current collector 11 is not particularly limited as long as the resistivity thereof is known. That is to say, a technique of this embodiment can be applied in the case in which a negative electrode active material for a non-aqueous electrolyte primary battery or a negative electrode active material for an aqueous electrolyte battery is formed on the current collector. Furthermore, as the technique for feeding back the composition and the deposit amount of the active material to the formation process, in addition to the case in which an active material layer is formed by a gas phase method, it is also possible to use a case in which an active material layer is formed by, for example, a liquid phase method such as electrolysis. This case can be also reflected to the formation conditions. Furthermore, also in the case in which a positive electrode active material is formed on the current collector, the technique can be formed.

Note here that in this embodiment, the thickness of active material layer 12 is measured by using thickness measurement device 51 including a laser displacement gauge. However, the measurement is not particularly limited to this alone. The displacement of rolls may be measured by linear gauge by sandwiching current collector 11 on which active material layer 12 is formed between two rolls. For this roll, resistance measurement roll 53 may be used. Furthermore, when thickness measurement device 51 including laser displacement gauge is used, in addition to a case in which resistance measurement roll 53 is disposed on the opposite side of the surface which is to be irradiated with a laser, by irradiating with laser from the both sides so as to correct the effect of displacement of current collector 11 itself. The thickness of active material layer 12 may be measured with accuracy according to the thickness.

Furthermore, in FIG. 12, current collector 11 on which active material layer 12 is formed is sandwiched by resistance measurement rolls 53. However, resistance measurement rolls 53 may be disposed in which they are displaced from each other in the direction in which current collector 11 moves. In this case, the amount of active material layer 12 existing between resistance measurement rolls 53 is increased, thus improving the measurement accuracy.

In the first to third embodiments, the composition of active material layer 12 is measured by different methods, and the deposit amount of active material layer 12 can be measured by using information obtained accompanying each configuration. However, the combination thereof may be employed. That is to say, for example, a manufacturing apparatus may be configured by using XRF 30A as a first measurement section and calculation section 33 as a first calculation section in the first embodiment, by providing measuring winding-out roll 42 for supplying measuring current collector 41, and using FTIR 43 as a second measurement section and calculation section 46 as a second calculation section in the second embodiment. In this case, calculation section 33 estimates the composition of active material layer 12, and calculation section 46 calculates a unit deposit amount of active material layer 12. Control section 34 controls the composition and unit deposit amount of active material layer 12 based on these pieces of information. An apparatus for manufacturing a negative electrode for a non-aqueous electrolyte secondary battery may be configured in this way. Similarly, the composition of active material layer 12 may be estimated by a configuration and method in accordance with the first embodiment, and the unit deposit amount of active material layer 12 may be calculated by a configuration and method in accordance with the third embodiment. The composition of active material layer 12 may be estimated by the configuration and method in accordance with the second embodiment, and the unit deposit amount of active material layer 12 may be calculated by the configuration and method in accordance with the first or third embodiment. The composition of active material layer 12 may estimated by the configuration and method in accordance with the third embodiment, and the unit deposit amount of active material layer 12 may be calculated in accordance with the first or second embodiment.

Fourth Embodiment

Figure 15:
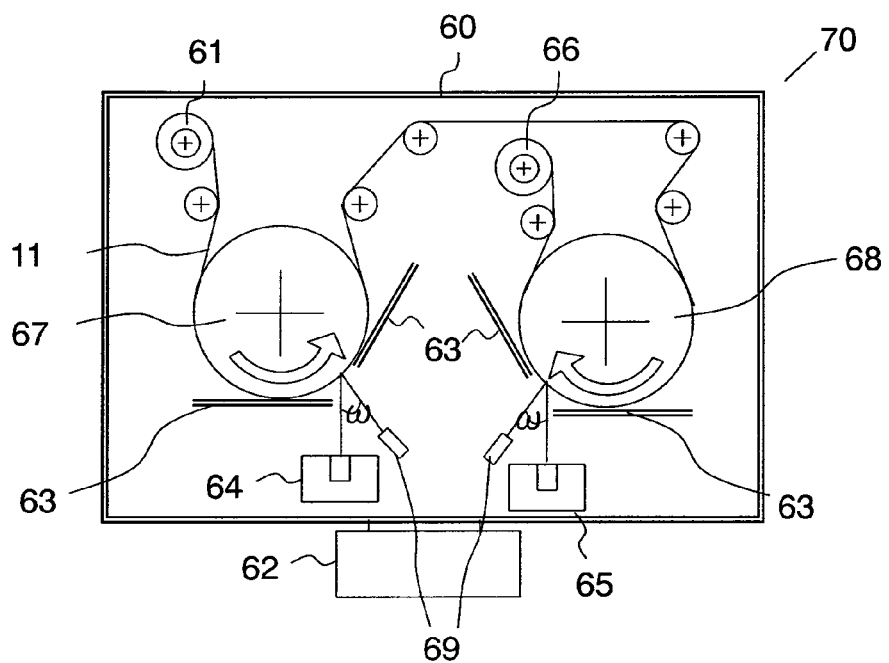
FIG. 15 is a schematic view showing a configuration of an apparatus for manufacturing a negative electrode for a non-aqueous electrolyte secondary battery in accordance with a fourth embodiment of the present invention.
Figure 16:
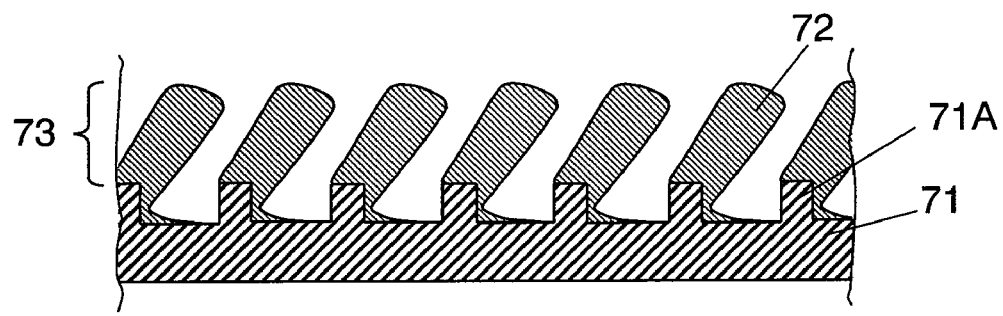
FIG. 16 is a schematic sectional view showing a negative electrode manufactured by using the apparatus thereof.

The method for measuring the composition and deposit amount of active material layer 12 in accordance with the first to third embodiments can be applied to the case in which the active material layer is formed in a form other than a film form. Hereinafter, the case in which an active material layer is produced by forming a plurality of columnar active material lumps is described. FIG. 15 is a schematic view showing a configuration of an apparatus for manufacturing a negative electrode for a non-aqueous electrolyte secondary battery, which is used for forming an active material layer including inclined columnar structured active material lumps in accordance with a fourth embodiment of the present invention. FIG. 16 is a schematic sectional view showing a negative electrode manufactured by using the apparatus of FIG. 15.

In manufacturing apparatus 70 shown in FIG. 15, current collector 71 is sent from winding-out roll 61 to winding-up roll 66 by way of deposition rolls 67 and 68. These rolls and vapor deposition units 64 and 65 are provided in vacuum chamber 60. The pressure inside vacuum chamber 60 is reduced by using vacuum pump 62. Vapor deposition units 64 and 65 are units each including a vapor deposition source, a crucible and an electron beam generator.

As shown in FIG. 16, current collector 71 has a large number of convex portions 71A. For example, a 30 µm-thick electrolytic copper foil provided with concavity and convexity portions (Ra=2.0 µm) by electrolytic plating is used as current collector 71. Convex portions 71A are provided on both surfaces of current collector 71, but only one side is shown in FIG. 16.

The inside of vacuum chamber 60 is an atmosphere of low-pressure inactive gas, for example, an argon atmosphere with the pressure of 3.5 Pa. At the time of vapor deposition, an electron beam generated by an electron beam generator is polarized by a polarization yoke, and the vapor deposition source is irradiated with the polarized beam. For this vapor deposition source, for example, Si is used. By adjusting the shape of the opening of mask 63, Si vapor generated from vapor deposition units 64 and 65 do not enter the surface vertically to the surface of current collector 71.

In this way, Si vapor is supplied to the surface of current collector 71 while current collector 71 is sent from winding-out roll 61 to winding-up roll 66. At this time, mask 63 is adjusted so that Si vapor enters at an angle of ω with respect to a normal line of current collector 71 and oxygen is introduced into vacuum chamber 60 from nozzle 69. Thus, active material lump 72 including $SiO_x$ is generated. For example, the angle ω is set to 65° and oxygen with purity of 99.7% is introduced from nozzle 69 into vacuum chamber 60, and a film is formed at the deposition speed of about 20 nm/sec. Then, a plurality of active material lumps 72, each being a columnar body starting from convex portion 71A of current collector 71 as a base point, are generated. The columnar body has a thickness of 21 μm and is made of $SiO_{0.4}$. Thus, active material layer 73 can be formed.

Active material lump 72 is formed on one surface of deposition roll 67 and then current collector 71 is sent to deposition roll 68. Thus, active material lump 72 can be formed on the other surface by the same method. Furthermore, heat resistant tapes are attached in equal intervals on both surfaces of current collector 71 in advance and these tapes are detached after the film is formed. Thereby, it is possible to form a current collector exposed portion to which a negative electrode lead is welded.

Figure 17:
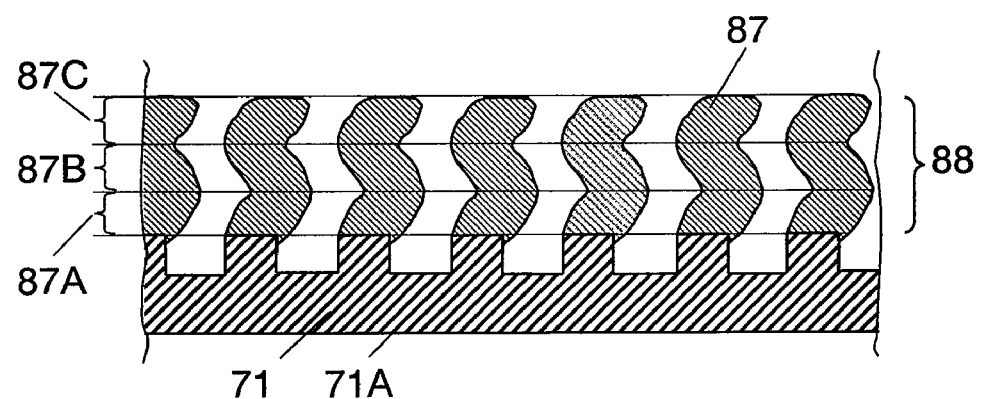
FIG. 17 is a schematic sectional view showing another negative electrode for a non-aqueous electrolyte secondary battery in accordance with the fourth embodiment of the present invention.

In the above description, a method for forming an active material layer made of inclined columnar structured active material lumps is described. In addition to this, an active material layer formed of columnar structured active material lumps with bending points can be formed. FIG. 17 is a schematic sectional view showing another negative electrode for a non-aqueous electrolyte secondary battery provided with an active material layer formed of columnar structured active material lumps with bending points. In order to form active material layer 88 having such a shape, for example, by using manufacturing apparatus 70 shown in FIG. 15, firstly, columnar body portion 87A in the first stage is formed. Next, wound-up current collector 71 is set to winding-out roll 61 again and sent to deposition roll 67, and $SiO_x$ is deposited. Thus, columnar body portion 87B in the second stage, which is inclined in the opposite direction, is formed. Next, wound-up current collector 71 is set at winding-out roll 61 again and sent to deposition roll 67, and $SiO_x$ is deposited. Then, columnar body portion 87C in the third stage, which is inclined in the same direction as columnar body portion 87A, is formed. Thus, active material lump 87 including three stages of columnar body portions is formed on current collector 71. Thus, active material layer 88 can be formed.

In addition to the above-mentioned method, by the methods described in Japanese Patent Application Unexamined Publication Nos. 2003-17040 and 2002-279974, a negative electrode having a plurality of columnar active material lumps formed on the surface of the current collector may be formed. However, it is preferable that active material lump 72 is inclined with respect to the surface of current collector 71 as shown in FIG. 16, or active material lump 87 having a bending point is formed as shown in FIG. 17. By forming such active material lumps 72 and 87, the charge-discharge cycle property of the negative electrode is improved. The reason therefor is not clear, but one of the reasons is thought to be as follows. An element having a lithium ion absorbing property is expanded and contracted when it absorbs and releases lithium ions. Stress generated accompanying the expansion and contraction is dispersed in the direction in parallel to the surface on which active material lumps 72 and 87 are formed and in the direction perpendicular to the same surface. Therefore, since the generation of wrinkle of current collector 71 and exfoliation of active material lumps 72 and 87 are suppressed, it is said that the charge-discharge cycle property is improved.

By applying the configuration for measuring the composition and deposit amount of active material layer 12 by the first to third embodiments to these manufacturing apparatuses, it is possible to measure the composition and deposit amount of active material layer 73 and columnar body portions 87A, 87B and 87C constituting active material layer 88. The configuration of manufacturing apparatus 70 shown in FIG. 15 is the same as the manufacturing apparatus shown in FIG. 1 except that mask 63 is provided instead of masks 22A and 22B and an incident angle of Si vapor with respect to the current collector is different. Therefore, XRF 30A in accordance with the first embodiment, FTIR 43 in accordance with the second embodiment and thickness measurement device 51 and resistance measurement roll 53 in accordance with the third embodiment can be incorporated easily.

Note here that the composition and deposit amount of columnar body portions 87A, 87B and 87C constituting active material layer 88 can be made to be different from each other by changing the conditions at the time of formation. For example, columnar body portion 87A is allowed to have a large value x from the viewpoint of maintaining the adhesion to current collector 71. The value x may be reduced from columnar body portions 87B to 87C, sequentially in this order. Thus, the capacity density can be improved. The value x can be changed by controlling the generated amount of Si vapor and the flow amount of oxygen. Then, the deposit amount thereof may be changed. Also in this case, the composition and deposit amount of columnar body portions 87A, 87B and 87C can be measured by applying different calibration curves, respectively. Furthermore, when active material layer 73 is formed, $SiO_x$ having a large value x is formed around convex portion 71A and $SiO_x$ having a small value x is formed thereon, the effect similar to that of the above-mentioned active material layer 88 can be obtained. Also in this case, different calibration curves may be applied to the respective compositions. That is to say, when the formation section changes the oxidation number of Si in active material layers 73 and 88 in a stepwise manner in the direction of deposition, control section 34 adjusts the condition for forming active material layers 73 and 88 in each stage based on at least one of the intensity of SiKα ray and the intensity of OKα ray measured in each stage.

Note here that the method in accordance with the third embodiment is applied by assuming that porosity of active material layers 73 and 88 are constant. Only when this condition is satisfied, by correcting the volume resistivity with the porosity, it is possible to estimate the composition of active material layers 73 and 88. Furthermore, by the correction with the porosity, it is possible to calculate the deposit amount of an active material per unit area of current collector 71 from the thickness.

Furthermore, since active material lumps 72 and 87 are not upright with respect to current collector 71, the route of electric current when the resistance is measured does not match the thickness of active material layers 73 and 88. Therefore, it is desirable that the volume resistivity is corrected by observing an obliquely rising angle by microscopic observation. For example, in the case of active material lump 72, the correction can be carried out by the equation (1).

$$\rho_v = R \times \frac{S}{a} \times (1-v) = R \times \frac{S\cos\theta}{t} \times (1-v) \quad (1)$$

$\rho_v$: volume resistivity, t: thickness of active material layer, a: obliquely rising length of an active material lump, θ: obliquely rising angle of an active material lump, R: resistance value, S: measurement area, v: porosity Furthermore, each of active material lumps 72 and 87 is brought into point contact with resistance measurement roll 53 at the top thereof. Therefore, the contact resistance is measured in a state in which it is added to the resistance of active material lumps 72 and 87 themselves, and the measurement accuracy of the composition and deposit amount is deteriorated. Then, it is preferable that a low-resistant material such as gold, or a flexible conductive material are interposed between resistance measurement roll 53 and active material layer 73 or active material layer 88. A conductive rubber can be applied as such a material. The sheet of such a material may be interposed between resistance measurement roll 53 and active material layer 73 or active material layer 88, or such a material may be provided on the surface of resistance measurement roll 53. Furthermore, such a configuration may be applied to the case in which a material layer that is brought into surface contact with resistance measurement roll 53 is formed.

Figure 18:
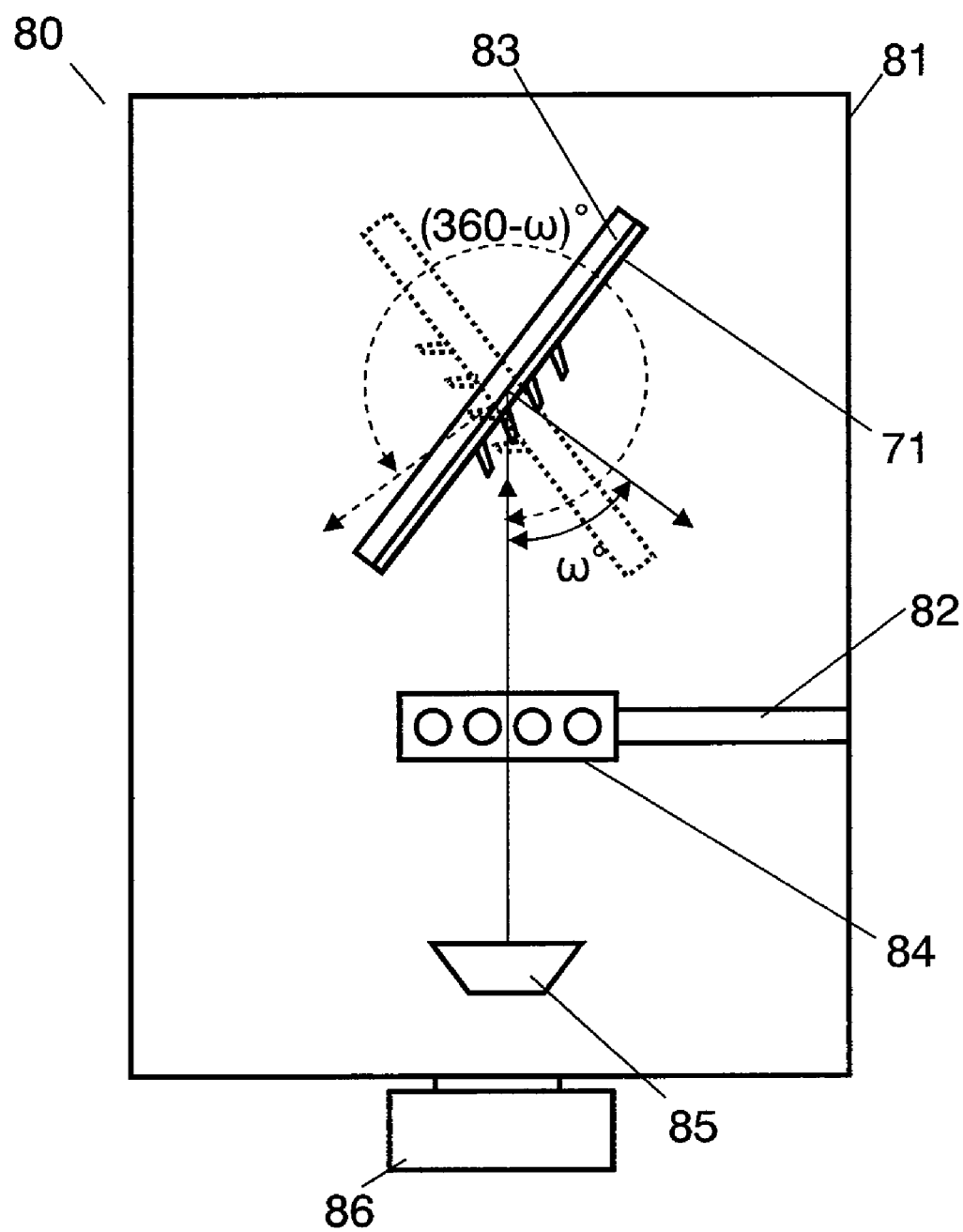
FIG. 18 is a schematic sectional view showing another negative electrode for a non-aqueous electrolyte secondary battery in accordance with the fourth embodiment of the present invention.

Furthermore, active material layer 88 may be formed by a manufacturing apparatus described below. FIG. 18 is a schematic sectional view showing another negative electrode for a non-aqueous electrolyte secondary battery, which is used for forming an active material layer including active material lumps having a columnar structure with bending points in accordance with a fourth embodiment of the present invention.

Manufacturing apparatus 80 includes vapor deposition unit 85 for depositing a material on the surface of current collector 71 so as to form a columnar body, gas introducing tube 82 for introducing oxygen into vacuum chamber 81, and fixing stand 83 for fixing current collector 71. At the tip of gas introducing tube 82, nozzle 84 for releasing oxygen into vacuum chamber 81 is provided. These are disposed in vacuum chamber 81. Vacuum pump 86 reduces the pressure of the inside of vacuum chamber 81. Fixing stand 83 is disposed on the upper part of nozzle 84. Vapor deposition unit 85 is disposed in the vertically under fixing stand 83. Vapor deposition unit 85 includes an electron beam that is a heating section and a crucible in which a vapor deposition raw material is disposed. In manufacturing apparatus 80, it is possible to change the positional relation between current collector 71 and vapor deposition unit 85 according to an angle of fixing stand 83.

Next, a procedure for forming a columnar body made of $SiO_x$ and having a bending point on current collector 71 is described. Firstly, by using a metal foil of copper, nickel and the like, as a base material, convex portion 71A is formed on the surface by a plating method. Thus, current collector 71 on which convex portions 71A are formed in the intervals of, for example, 20 μm is prepared. Then, current collector 71 is fixed to fixing stand 83 shown in FIG. 18.

Next, fixing stand 83 is set so that the direction of a normal line of current collector 71 is at an angel of ω° (for example, 55°) with respect to the incident direction from vapor deposition unit 85. Then, for example, Si is heated by an electron beam so as to be evaporated and allowed to enter the convex portion 71A of current collector 71. At the same time, oxygen is introduced from gas introducing tube 82 and supplied from nozzle 84 to current collector 71. That is to say, the inside of vacuum chamber 81 is made to be an atmosphere of oxygen of the pressure of, for example, 3.5 Pa. Thus, $SiO_x$, which is a combination of Si and oxygen, is deposited on convex portions 71A of current collector 71. The columnar body portion 87A on the first stage is formed to the predetermined height (thickness).

Next, as shown in a broken line of FIG. 18, fixing stand 83 is rotated so that the normal line direction of current collector 71 is located at the position of the angle (360−ω)° (for example, 305°) with respect to the incident direction of vapor deposition unit 85. Then, Si is evaporated from vapor deposition unit 85 and allowed to enter columnar body portion 87A in the first stage of current collector 71 from the direction opposite to the direction in which columnar body portion 87A expands. At the same time, oxygen is introduced from gas introducing tube 82 and supplied to current collector 71 from nozzle 84. Thus, $SiO_x$ is formed as columnar body portion 87B of the second stage with a predetermined height (thickness) on columnar body portion 87A in the first stage.

Next, fixing stand 83 is returned to an original state and columnar body portion 87C in the third stage is formed on columnar body 87B with a predetermined height (thickness). Thus, columnar body portion 87B and columnar body portion 87C are formed so that the obliquely rising angle and obliquely rising direction are different from each other, and columnar body portion 87A and columnar body portion 87C are formed in the same directions. Thus, active material lump 87 including three stages of columnar body portions is formed on current collector 71. Thus, active material layer 88 can be formed.

In the above description, active material lump 87 including three stages of columnar body portions is described as an example. However, active material layer 87 it is not limited to this alone. For example, by repeating adjustment of an angle of fixing stand 83, it is possible to form a columnar body including any n stages (n≧2) of columnar body portions. Furthermore, the obliquely rising direction of each stage of a columnar body including n stages can be controlled by changing an angel ω made by the normal line direction of the surface of current collector 71 with respect to an incident direction from vapor deposition unit 85 with fixing stand 83.

In manufacturing apparatus 80, the composition of active material layer 88 can be estimated by the method in accordance with the first embodiment. In this case, the composition can be estimated during the formation of each columnar body portion. In this case, when the film thickness is not sufficient, as described in the first embodiment, it is necessary to correct with respect to the thickness. The measurement of the deposit amount by CuKα and the like can be applied as it is.

Furthermore, in the method in accordance with the second embodiment, when the thickness of active material layer 88 is small, active material layer 88 formed on current collector 71 is irradiated with an infrared ray, so that the composition can be estimated. When the deposit amount is estimated, the deposit amount of active material layer 88 is estimated by shortening the deposition time and forming an active material layer for measuring.

Since the method in accordance with the third embodiment cannot be applied during the deposition of $SiO_x$ on current collector 71, at the time when the formation of each columnar body portion is finished, the thickness and the resistance value of active material layer 88 are measured. Thus, the composition and the deposit amount of each columnar body portion can be estimated.

As mentioned above, according to the method for manufacturing a negative electrode of the present invention, when the negative electrode active material is formed on the current collector, it is possible to judge whether or not the composition of the negative electrode active material is correct. Therefore, batteries with less variation of properties such as capacitance can be manufactured stably. The battery using a negative electrode manufactured by the manufacturing method of the present invention is effective for main power supply of mobile communication equipment, portable electronic equipment, and the like.

What is claimed is:

1. A method for manufacturing a negative electrode for a battery, the method comprising steps of:

forming an active material layer on a surface of a current collector by a gas phase method, the active material layer including a metallic element M and an element A that is at least any one of oxygen, nitrogen and carbon;
during the step of forming, irradiating the active material layer with an X ray;
measuring at least one of intensity of a Kα ray of the element A and intensity of a Kα ray of the metallic element M in fluorescent X-rays generated from the active material layer; and
adjusting a condition for forming the active material layer based on a first relationship between the intensity of the Kα ray of the element A and an oxidation number of the metallic element M or between the intensity of the Kα ray of the metallic element M and an oxidation number of the metallic element M, so as to match the oxidation number of the metallic element M in the active material layer to a predetermined value, wherein:
the current collector is formed of a metal including at least any one of copper, nickel, titanium and iron, and the metallic element M is silicon,
an attenuation amount of any one of a CuKα ray, a NiKα ray, a TiKα ray, and a FeKα ray, which are fluorescent X-rays of metals included in the current collector in fluorescent X-rays generated when at least one of the intensity of the Kα ray of the element A and the intensity of the Kα ray of the metallic element M is measured, is measured, and
the condition for forming the active material layer is further adjusted based on a second relationship among an oxidation number of the metallic element M, an attenuation amount of any one of a CuKα ray, a NiKα ray, a TiKα ray and a FeKα ray, and a deposit amount of the active material layer per unit area of the current collector, so as to match the deposit amount to a predetermined value based on the attenuation amount.

2. A method for manufacturing a negative electrode for a battery, the method comprising steps of:
forming an active material layer on a current collector, the active material layer including a metallic element M and an element A that is at least any one of oxygen, nitrogen and carbon;
during the step of forming, irradiating the active material layer with an X ray;
measuring at least one of intensity of a Kα ray of the element A and intensity of a Kα ray of the metallic element M in fluorescent X-rays generated from the active material layer; and
estimating an oxidation number of the metallic element M in the active material layer from at least one of the measured intensity of the Kα ray of the element A and intensity of the Kα ray of the metallic element M, wherein:
the current collector is formed of a metal including at least any one of copper, nickel, titanium and iron, and the metallic element M is silicon, and
the method further comprises
calculating a deposit amount of the active material layer based on the estimated oxidation number of the metallic element M, and an attenuation amount of any one of a CuKα ray, a NiKα ray, a TiKα ray and a FeKα ray, which are fluorescent X-rays of metals included in the current collector in the fluorescent X-rays generated when at least one of the intensity of the Kα ray of the element A and the intensity of the Kα ray of the metallic element M is measured.

3. A method for manufacturing a negative electrode for a battery, the method comprising steps of:
forming an active material layer on a surface of a current collector by a gas phase method, the active material layer including a metallic element M and an element A that is at least any one of oxygen, nitrogen and carbon;
irradiating the active material layer with an X ray;
measuring at least one of intensity of a Kα ray of the element A and intensity of a Kα ray of the metallic element M in fluorescent X-rays generated from the active material layer; and
adjusting a condition for forming the active material layer so as to match an oxidation number of the metallic element M in the active material layer to a predetermined value based on at least one of the measured intensity of the Kα ray of the element A and intensity of the Kα ray of the metallic element M, wherein:
the current collector is sent, and in the forming of the active material layer, an active material layer for measuring made of a compound including the metallic element M and the element A is formed also on a surface of a measuring current collector that is being sent faster than the current collector,
the method further comprises irradiating the active material layer for measuring with an infrared ray, and
adjusting a condition for forming the active material layer based on intensity of a wave number specific to a compound including the metallic element M and the element A in a reflected infrared ray so as to match a deposit amount of a compound including the metallic element M and the element A per unit area of the current collector to a predetermined value.

* * * * *